United States Patent
Gilg

(10) Patent No.: US 9,665,726 B2
(45) Date of Patent: May 30, 2017

(54) PRINTING OF ENCRYPTED PRINT CONTENT

(75) Inventor: Thomas J. Gilg, Shedd, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1372 days.

(21) Appl. No.: 13/192,079

(22) Filed: Jul. 27, 2011

(65) Prior Publication Data

US 2013/0027739 A1   Jan. 31, 2013

(51) Int. Cl.
| | | |
|---|---|---|
| G06F 3/12 | (2006.01) | |
| G06F 21/60 | (2013.01) | |
| G06K 15/00 | (2006.01) | |

(52) U.S. Cl.
CPC .......... *G06F 21/608* (2013.01); *G06F 3/1222* (2013.01); *G06F 3/1267* (2013.01)

(58) Field of Classification Search
CPC ............... G06F 21/1238; G06F 21/608; G06F 21/6209; G06F 3/1222; G06K 15/4095; H04N 1/4486
See application file for complete search history.

(56) References Cited

U.S. PATENT DOCUMENTS

| | | | |
|---|---|---|---|
| 6,141,753 A | 10/2000 | Zhao | |
| 6,378,070 B1 | 4/2002 | Chan | |
| 6,452,692 B1* | 9/2002 | Yacoub | 358/1.15 |
| 2006/0290981 A1* | 12/2006 | Oh | 358/1.15 |
| 2009/0048978 A1 | 2/2009 | Ginter | |
| 2009/0063860 A1* | 3/2009 | Barnett et al. | 713/171 |
| 2009/0133103 A1 | 5/2009 | Sathyan | |
| 2011/0188063 A1* | 8/2011 | Nuggehalli et al. | 358/1.13 |

OTHER PUBLICATIONS

Trend Micro, SecureCloud 1.0—Encrypting and Controlling Private Data in the Cloud, 2010 (2 pages).

* cited by examiner

*Primary Examiner* — Thierry L Pham
(74) *Attorney, Agent, or Firm* — Trop, Pruner & Hu, PC

(57) ABSTRACT

Encrypted print content is to be decrypted to produce decrypted print content. The decrypted print content is then printed.

14 Claims, 5 Drawing Sheets

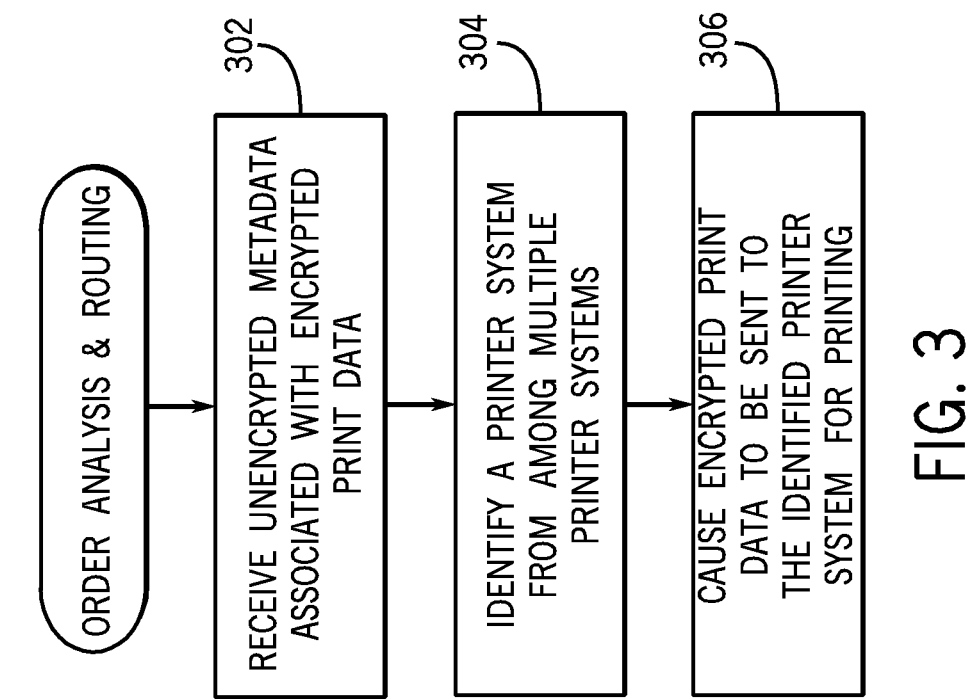
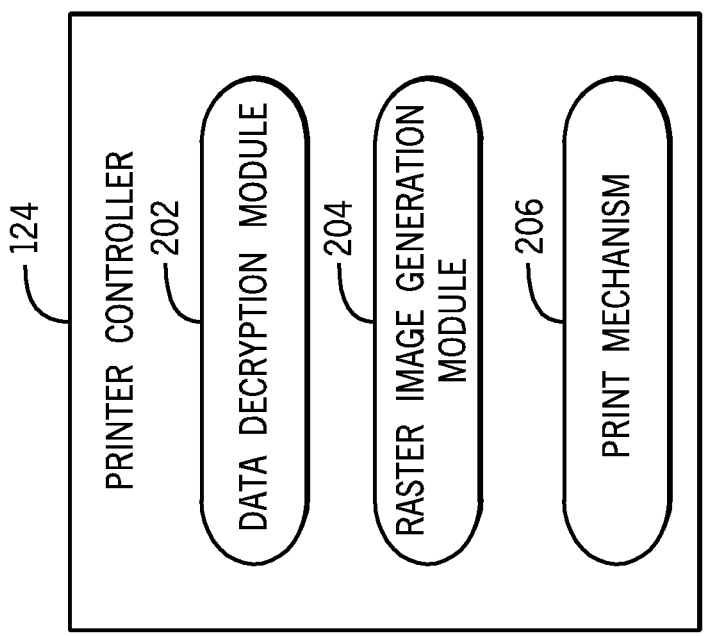

PRINTING OF ENCRYPTED PRINT CONTENT

BACKGROUND

Public networks such as the Internet allow for convenient communications among users and devices. Various services are provided on public networks, including cloud storage, printing services, and so forth. However, a concern associated with access of services over public networks is the lack of adequate security when communicating data to services.

BRIEF DESCRIPTION OF THE DRAWINGS

Some embodiments are described with respect to the following figures:

FIGS. 2-4 and 6 are flow diagrams of processes for allowing printing of print content, according to some implementations;

DETAILED DESCRIPTION

Figure 1:
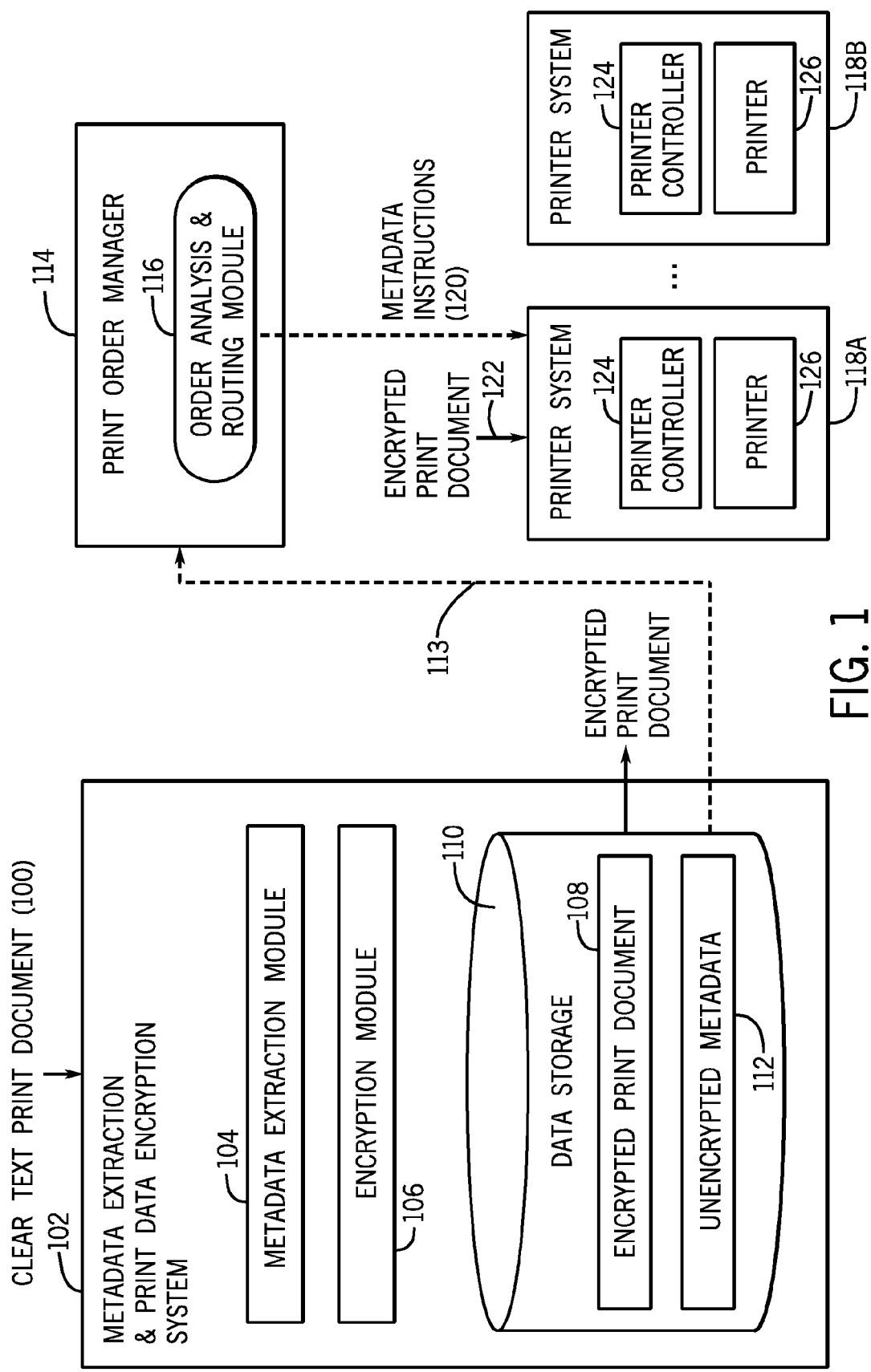
FIG. 1 is a block diagram of an example arrangement incorporating some implementations.

Various services can be provided over a public network, such as the Internet. A "public network" refers to a network, or collection of networks, that is generally accessible by users or devices. Examples of services available over a public network include print services (provided by a print service provider), cloud storage services, and so forth.

"Cloud storage" refers to any storage subsystem or collection of storage subsystems that is accessible over a public network for storing data. A user or device can send data to the cloud storage for storing, and the user or device can subsequently retrieve the previously stored data from the cloud storage.

A print service is accessed by sending print content over a public network to a print service provider, which provides print infrastructure to allow printing of the print content. Generally, "content" refers to data exchanged with a service or communicated between services. "Print content" refers to content that is to be printed. In some examples, print content can be stored in a cloud storage, where the print content can be submitted for printing at a later time. In some cases, the print content in the cloud storage can be submitted to a local printer for printing (where a "local printer" refers to a relatively secure printer associated with a user or enterprise), while in other cases, the print content in the cloud storage can be submitted to a print service provider for printing. Print content (and associated metadata, discussed further below) can be distributed to various services, where the print content and associated metadata can be stored (parked) for subsequent printing. The stored print content can then be the subject of one or multiple print requests that can be submitted to printer system(s) for printing.

An issue associated with accessing services over a public network is the secure exchange of information (print content) with services, including print services. A challenge is to allow the services to know enough about the content to perform their respective tasks, without every service having to know everything about the full content, or empowering every service with mechanisms (such as encryption keys) to access the full content. Lack of security may result if the print content communicated over a network is protected by an inadequate security mechanism or is not protected by any security mechanism. Moreover, staff members that manage services available over a public network may often not be trusted, since they may not be bound of standards-of-conduct agreements or policies.

For example, print content (communicated over a public network for printing) may include confidential and proprietary data, or data subject to copyright protection (e.g. text books, copyrighted articles, etc.). If proper steps are not taken to protect the print content, unauthorized access of the print content may occur. Examples of scenarios where print content is to be communicated over the public network include the following. The print content may be stored in cloud storage, and later submitted for printing over the public network (whether at a local printer or at a printer of a print service provider). Alternatively, the print content may be initially stored at a secure location (e.g. a user computer or a server within an enterprise), and later submitted over the public network to a print service provider for printing.

In accordance with some implementations, print content that is to be communicated over a public network is encrypted as early as possible on entry or prior to entry into an environment that may have vulnerabilities with respect to data security. Moreover, the encrypted print content is not decrypted until the encrypted print content has reached a printer system where printing is to be performed. By delaying the decryption of encrypted print content until the encrypted print content has reached the printer system, interception of the print content is made more difficult. A "printer system" can refer to a printer, or a combination of a printer and a printer controller for controlling printing by the printer.

To enhance efficiency in accordance with some implementations, metadata associated with the encrypted print content remains in unencrypted form. "Metadata" refers to additional data that describes content (including print content); the metadata can be embedded with the content file, or the metadata can be communicated separately in an independent file. The metadata can be used for determining an appropriate printer system (from among multiple printer systems) to which print content is to be submitted for printing. Matching a printer system to the metadata allows for an appropriate or more effective (e.g. most optimal, most efficient, least costly, etc.) printer system to be selected that is able to handle printing specifications specified by the metadata. Metadata associated with the print content can include information that can affect how the print content is to be printed by a printer. The metadata can indicate features of the print content that would control which of multiple printers would be more appropriate for printing of the print content. In some cases, humans can also make printing decisions based on the metadata associated with print content. For example, a user may wish to view the metadata prior to making a purchase decision to print. As a specific example, a book may be marketed as 8"×10" in size, but technically the metadata can indicate that the book is 7.75"× 9.75" in size, which can be an issue for some users. As another specific example, a print shop manager can decide, based on metadata associated with print content, which printer systems are optimized for the print content so that the print content can be routed to the appropriate printer system.

Examples of metadata are set forth below. The following are provided for purposes of example, as other implementations can employ alternate or additional metadata.

A metadata item relating to mixed page orientation, which indicates whether a document containing print content has a mixture of landscape pages and portrait pages that may involve special processing at a printer.

A metadata item that indicates whether or not fonts are embedded in the document containing the print content. Such information allows the printer to determine whether the print content is embedded with fonts, or whether the printer would have to substitute fonts during print processing.

A metadata item that indicates whether or not the document containing print content has an explicit trim box. A "trim box" defines the intended dimensions of the finished print product. If an explicit trim box is available, trimming equipment and workflow can be optimized ahead of time, prior to the product being printed.

A metadata item that indicates whether the document containing print content has a mixture of trim boxes that may involve special handling at trim time.

A metadata item that indicates whether the document containing print content has any vector fonts, which may influence which raster image processing technique (from among multiple raster image processing techniques) to use. Note that different printer systems may employ different raster image processing techniques.

A metadata item that indicates whether the document containing print content has any images, which may influence which raster image processing technique to use. The presence of images may also imply high ink or toner density, which should be accommodated when printing by a printer.

A metadata item that indicates whether the document containing print content includes scanned content, which may influence which raster image processing technique to use (e.g. should a noise reduction technique be used and/or special dithering technique be used to overcome noise that often occurs in scanning).

A metadata item that indicates whether the document containing print content has any color elements (non black-and-white elements), which may influence the raster image processing technique or choice of printer (e.g. color printer versus monochrome printer) to use.

A metadata item that indicates the real page count in the document containing print content (the count of the number of pages of the document), which can influence print handling and billing charges.

A metadata item that specifies page/paper size.

A metadata item that indicates the maximum ink/toner density found in the document containing print data. Ink-based printers can be challenged by large solid-color areas, as excessive moisture buildup of ink in a small area can swell the paper on which print data is being printed.

Note that certain metadata items apply to the whole document, while in other cases, metadata items apply to individual pages, or apply to both the whole document and individual pages. An example of a metadata item that applies to the whole document is the metadata item indicating whether the document has a mixture of landscape pages and portrait pages. An example of a metadata item that applies to an individual page is the metadata item indicating the page/paper size. An example of a metadata item that applies to both the whole document and the individual pages is the metadata item indicating whether the document has any color elements.

Some metadata items have values that are derived by calculations and algorithms, such as the metadata item relating to maximum image density, which can be calculated by running the document through a raster image processor or based on performing a print simulation.

FIG. 1 illustrates an example arrangement in which some implementations can be incorporated. A clear text (i.e. unencrypted) print document (100) is received by a metadata extraction and print content encryption system 102. A "print document" refers to any file or other collection of information that includes print content (to be printed) as well as metadata associated with the print content. As explained further below, the metadata extraction and print content encryption system 102 can be located at one or multiple locations.

The metadata extraction and print content encryption system 102 includes a metadata extraction module 104 and an encryption module 106. The metadata extraction module 104 processes the clear text print document 100 to extract metadata (including any combination of metadata items listed above, for example) from the print document 100. The encryption module 106 applies encryption on the clear text print document 100, to produce an encrypted print document 108 that is stored in a data storage 110. The encrypted print document 108 includes print content to be printed, as well as metadata 112 associated with the print content. The encryption applied by the encryption module 106 can include any of various types of encryption techniques, such as an AES (Advanced Encryption Standard) cipher technique or other technique. The AES cipher technique can be a 256-bit AES cipher technique, for example.

The encryption applied can involve blackbox encryption or whitebox encryption. Blackbox encryption confines keys and cryptographic algorithms in a logically protected and tamper-resistant module, such as a physically secure smart card or hardware security module. Whitebox encryption allows keys and cryptographically algorithms to be provided on a relatively open computing platform, which means that encryption/decryption activity may be observable (i.e. is less secure). Various obfuscation techniques (e.g. deriving an encryption key derived through multiple lookup tables, applying exclusive-ORing of values associated with the key, including fake entries in lookup tables, and so forth) can be used to perform obfuscation.

Unencrypted metadata 112 from the metadata extraction module 104 is also stored in the data storage 110. Note that the data storage 110 can be implemented with one or multiple storage subsystems. The data storage 110 can be located at an unsecure location or at a secure location. In some implementations, the data storage 110 can be part of a cloud storage infrastructure (also referred to as a cloud storage datacenter).

The unencrypted metadata 112 can be provided (113) to a print order manager 114. The communication of the unencrypted metadata 112 to the print order manager 114 can be over a secure or unsecure network. The print order manager 114 has an order analysis and routing module 116 that analyzes the unencrypted metadata 112 and determines, based on the analyzed unencrypted metadata 112, which of multiple printer systems 118A and 118B to route print content (in the encrypted print document 108) for printing. The encrypted print document 108 can be routed over either a secure or unsecure communication channel from the metadata extraction and print content encryption system 102. Although just two printer systems 118A and 118B are shown in FIG. 1, it is noted that in alternative examples, more than two printer systems can be provided.

The printer system identified by the order analysis and routing module 116 for routing print content is the printer system considered by the order analysis and routing module 116 to be the most appropriate printer system, based on the analysis of the unencrypted metadata 112. For example, the identified printer system can be the printer system that provides a raster image processing technique supporting feature(s) indicated by the metadata items of the unencrypted metadata 112. As another example, the identified printer system can include a color printer or monochrome printer, or can include an inkjet printer or laser jet printer, depending on the type of print content to be printed as indicated by the unencrypted metadata 112.

By providing the unencrypted metadata 112, the print order manager 114 does not have to decrypt the encrypted print document 108 for extracting metadata to perform its analysis and routing tasks. This improves processing efficiency at the print order manager 114, and also reduces risks associated with having to perform decryption of encrypted print document 108 at an intermediate stage prior to the print content being received at a printer system. Moreover, in some implementations, the encrypted print document 108 does not have to be sent to the print order manager 114. Instead, the encrypted print document 108 can be sent directly to an identified printer system (over a network, which can be a secure network or unsecure network), or routed through another entity. By not having to send an encrypted print document to the print order manager 114, processing and storage efficiency is also further enhanced since the print order manager 114 does not have to deal with processing and storing the encrypted print document 108.

In examples according to FIG. 1, it is assumed that the order analysis and routing module 116 has identified the printer system 118A as being the printer system most appropriate for printing the print content in the encrypted print document 108. Note that there can be multiple encrypted print documents 108 associated with different input clear text documents. In the example of FIG. 1, it is assumed that there is just one print document whose print content has been encrypted by the metadata extraction and print content encryption system 102. In examples where there are multiple input print documents 100 and multiple corresponding encrypted print documents 108, the order analysis and routing module 116 can select different ones of the printer systems 118A, 118B for printing the different print content in the respective encrypted print documents 108.

As further shown in FIG. 1, the order analysis and routing module 116 can send metadata instructions 120 to the identified printer system 118A. The metadata instructions 120 can include a copy of the entirety of or some portion of the unencrypted metadata 112. Alternatively or additionally, the metadata instructions 120 can include additional instructions generated based on the unencrypted metadata 112. The metadata instructions 120 are used to guide the printer system 118A when the printer system prints the associated print content.

As depicted in FIG. 1, the printer system 118A receives an encrypted print document 122, which can be from the data storage 110, or alternatively, can be routed through another entity. Each printer system 118A, 118B includes a printer controller 124 and printer 126. Although the printer controller 124 is shown as being separate from the printer 126, it is noted that in alternative implementations, the printer controller 124 can be part of the printer 126. Generally, the printer controller 124 (whether external to the printer 126 or being part of the printer 126) produces a printable image from input print content (in the input print document 122). In some examples, the printer controller 124 can be a raster image processor, which produces a raster image (sometimes referred to as a bitmap) from print content, where the raster image is sent to a printing subsystem of the printer 126 for printing. For example, the input (print document 122) to the printer controller 124 can include a page description in a high-level page description language, such as PostScript, Portable Document Format (PDF), XML Paper Specification (XPS), or some other format.

In some implementations, the printer controller 124 is able to decrypt the encrypted print content 122. The unencrypted print content is then printed by the printer 126.

Example components of the printer controller 124 are shown in FIG. 2. The printer controller 124 includes a data decryption module 202 for decrypting the encrypted print content 122. Moreover, the printer controller 124 includes a raster image generation module 204, which is able to generate a raster image from the input print content. The raster image generation module 204 uses the metadata instructions 120 from the order manager 114 to guide the generation of the raster image that is to be printed by the printer 126.

The printer controller 124 further includes a print mechanism 206 that communicates the raster image to the printer 126 for printing, where the communication can be through a secure socket or other interface.

FIG. 3 is a flow diagram of a process performed by the order analysis and routing module 116 of the print order manager 114 in FIG. 1, according to some implementations. The order analysis and routing module 116 receives (at 302) unencrypted metadata that is associated with an encrypted print content (such as in the encrypted print document 108 of FIG. 1). The order analysis and routing module 116 identifies (at 304) a printer system from among multiple printer systems (e.g. 118A, 118B) to which the encrypted print content is routed. The identifying is based on the unencrypted metadata received at 302. As an example, the printer system 118A may be optimized for printing color data, whereas the printer 118B is optimized for printing monochrome data. In such examples, the order analysis and routing module 116 would route color print content to the printer system 118B, but route monochrome print content to the printer system 118B.

The order analysis and routing module 116 next causes (at 306) the encrypted print content to be sent to the identified printer system for decryption of the encrypted print content and printing of the decrypted print content. For example, the order analysis and routing module 116 can send instructions to the metadata extraction and print content encryption system 102 (or some other entity) to route the encrypted print document to the identified printer system (e.g. 118A in FIG. 1). Alternatively, the order analysis and routing module 116 can retrieve the encrypted print document to send to the identified printer system.

Figure 4:
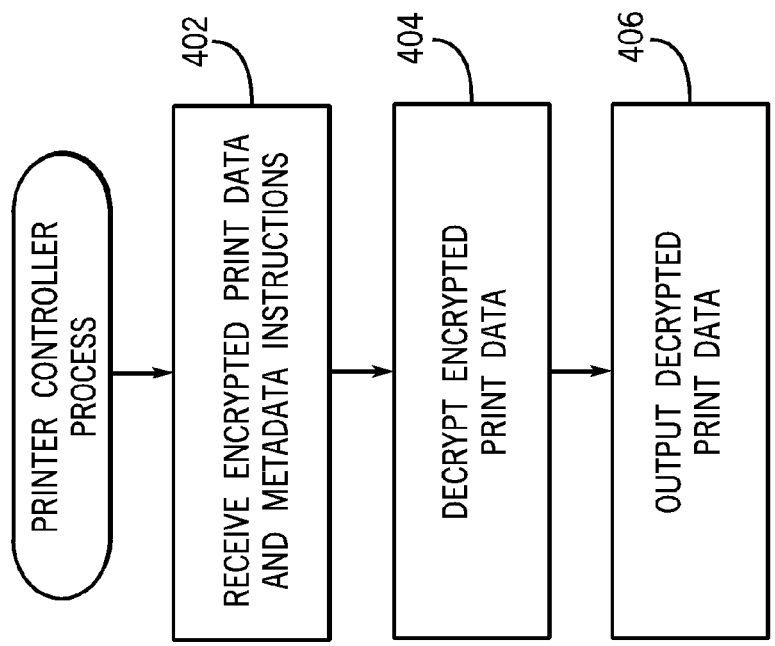

FIG. 4 is a flow diagram of a process performed by the printer controller 124, according to some implementations. The printer controller 124 receives (at 402) encrypted print content (e.g. in the encrypted print document 122 of FIG. 1) and metadata instructions (e.g. 120 in FIG. 1) from the print order manager 114. As noted above, the metadata instructions 120 are based on the unencrypted metadata 112.

The printer controller 124 next decrypts (at 404) the encrypted print content to produce decrypted print content. The decryption is performed by the data decryption module 202 of FIG. 2. Next, the printer controller 124 outputs (at 406), according to the metadata instructions, the decrypted print content for printing by the printer 126. The output of the decrypted print content can include the raster image produced by the raster image generation module 204, where the generated raster image is according to the metadata instructions.

Figure 5:
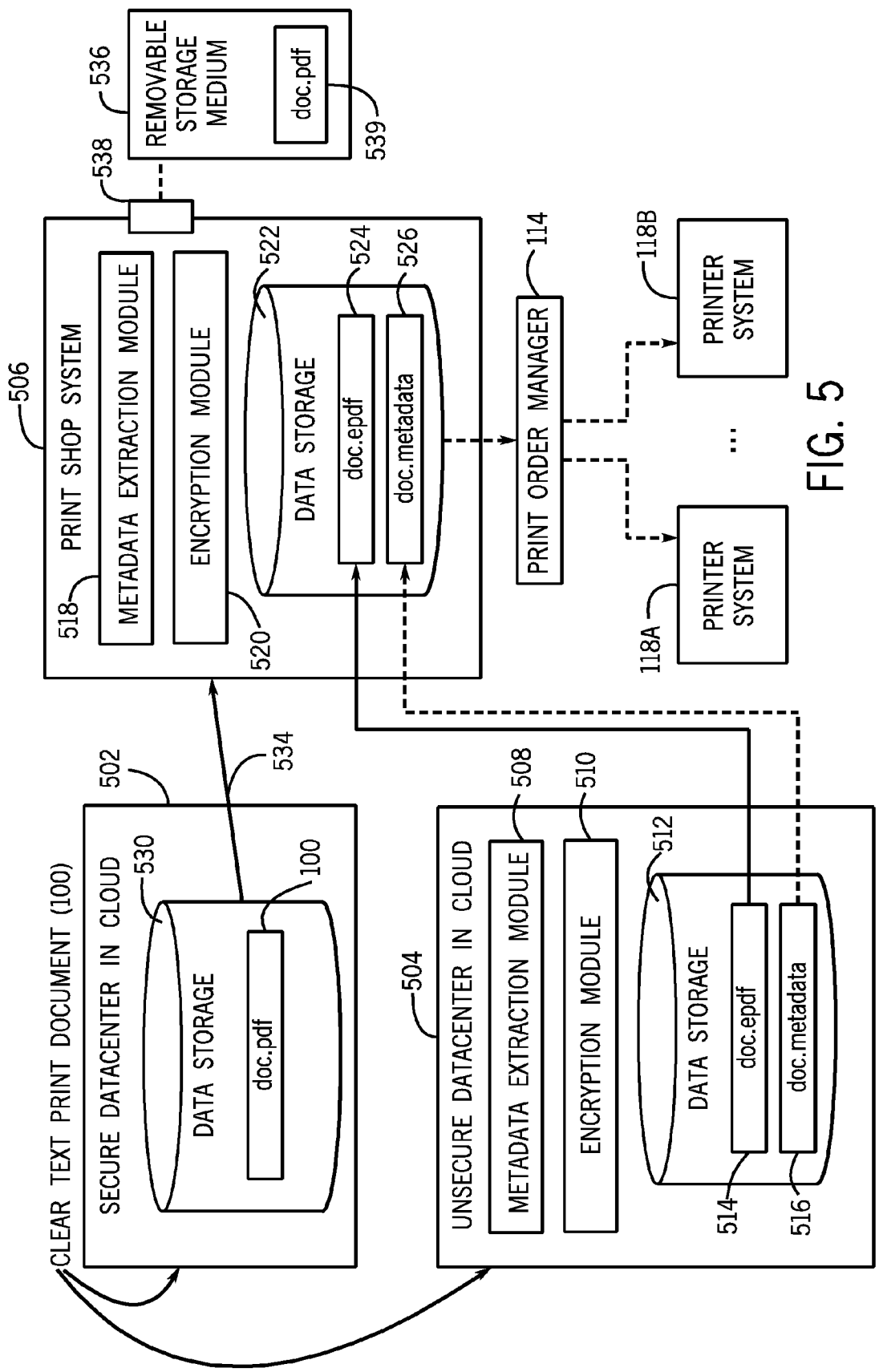
FIG. 5 is a block diagram of another example arrangement, according to alternative implementations.

FIG. 5 is a block diagram of a different arrangement of nodes, according to alternative implementations. As in implementations according to FIG. 1, the FIG. 5 arrangement also includes the print order manager 114 and the printer systems 118A and 1188 (containing the same or similar components as respective nodes in FIG. 1).

The FIG. 5 arrangement further includes a secure data center 502, an unsecure data center 504, and a print shop system 506. The secure data center 502 and unsecure data center 504 can provide cloud storage for print content. The secure data center 502 is considered to have sufficient security mechanisms implemented to allow for storing of the clear text print document 100 in a data storage 530 of the secure datacenter 502.

The unsecure datacenter 504 is considered to not be secure enough to allow for storage of the clear text print document 100 in a data storage 512 of the unsecure datacenter 504.

Each of the unsecure data center 504 and the print shop system 506 can be considered an instance of the metadata extraction and print content encryption system 102 of FIG. 1. As shown in FIG. 5, the unsecure datacenter 504 includes a metadata extraction module 508 and an encryption module 510 (similar to 104 and 106, respectively, in FIG. 1), along with the data storage 512 to store an encrypted print document 514 (encrypted by the encryption module 520 from the clear text print document 100) and unencrypted metadata 516 (extracted by the metadata extraction module 508 from the clear text print document 100).

Similarly, the print shop system 506 can also include a metadata extraction module 518, an encryption module 520, and a data storage 522 to store an encrypted print document 524 and unencrypted metadata 526. The encrypted print document 524 and unencrypted metadata 526 can be copied from items 514 and 516, respectively, of the data storage 512 of the unsecure datacenter 504. Alternatively, the encrypted print document 524 can be generated by the data encryption module 520, while the unencrypted metadata 526 can be extracted by the metadata extraction module 518.

There are two sources of input print content (in the form of a clear text print document, for example), at the print shop system 506. A first source is from the data storage 530 that is part of the secure datacenter 502, where the print document 100 in the data storage 530 can be communicated over a secure connection or transport 534 to the print shop system 506. A second source of the input print content can be from a removable storage medium 536, which can be inserted into a receptacle 538 (e.g. Universal Serial Bus or USB port, or other type of computer port) of the print shop system 506. The removable storage medium 536 stores a clear text print document 539, which can be retrieved by the print shop system 506 and processed through the metadata extraction module 518 and data encryption module 520.

Figure 6:
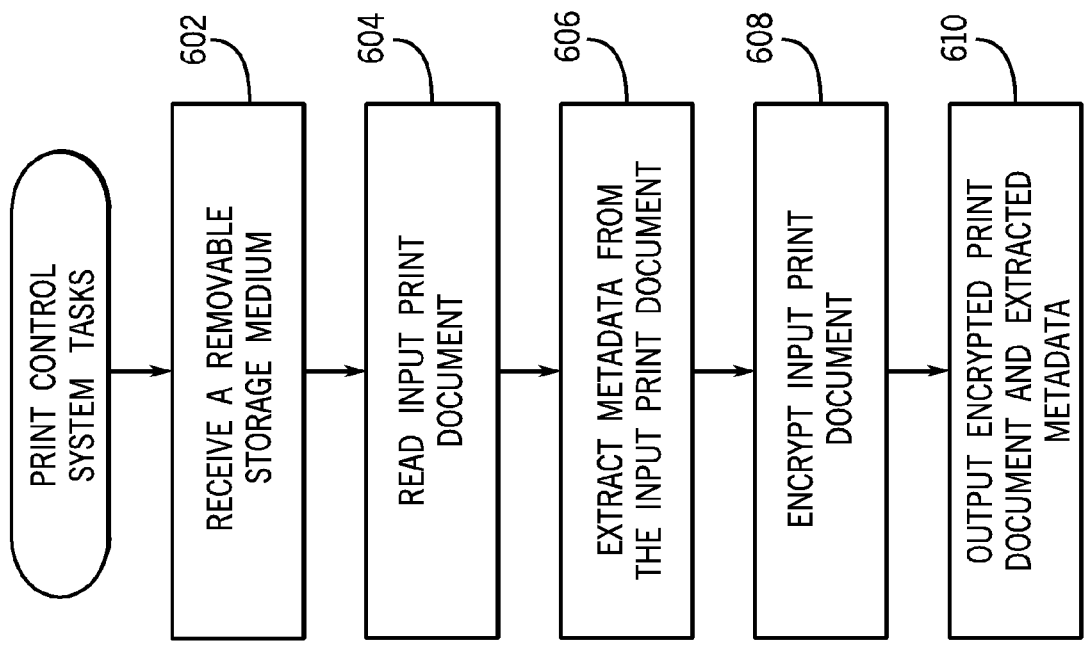

FIG. 6 is a flow diagram of a process performed by the print shop system 506, according to some implementations. More generally, the print shop system 506 is a type of a print control system that processes print content to be communicated for printing by a printer.

The print control system receives (at 602) the removable storage medium 536 at the receptacle 538 of the print control system. The print control system then reads (at 604) the input print document (539) from the removable storage medium 536. In some examples, the metadata extraction module 518 of the print control system can also extract (at 606) metadata from the input print document 539. The encryption module 520 of the print control system encrypts (at 608) the input print document 539.

The encrypted print document and extracted metadata are then output (at 610) for printing.

Figure 7:
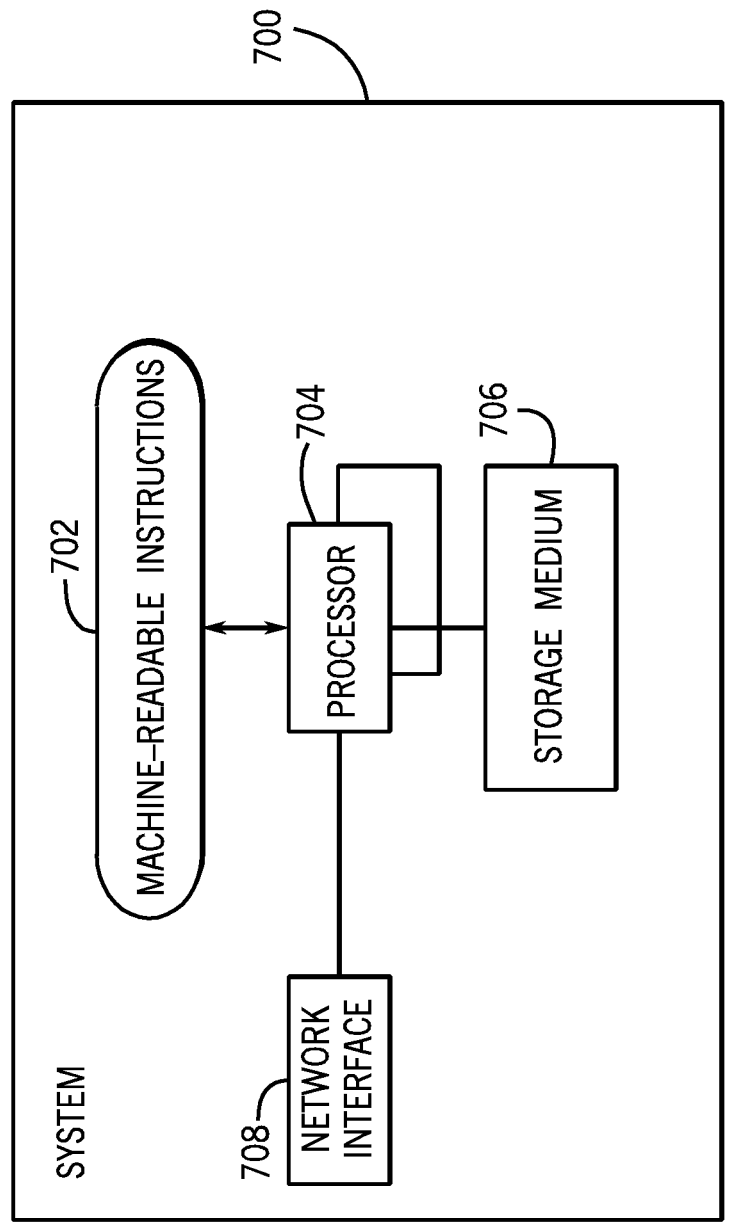
FIG. 7 is a block diagram of an example system capable of incorporating some implementations.

FIG. 7 is a block diagram of a system that can incorporate some implementations. The system 700 of FIG. 7 can be any one of the metadata extraction and print content encryption system 102, print order manager 114, printer controller 124, unsecure datacenter 504, and print shop system 506, discussed above. The system 700 includes machine-readable instructions 702, which can include any of the various modules discussed above in the foregoing nodes. The machine-readable instructions 702 are executable on one or multiple processors 704. A processor can include a microprocessor, microcontroller, processor module or subsystem, programmable integrated circuit, programmable gate array, or another control or computing device. The processor(s) 704 is (are) connected to a storage medium (or storage media) 706 and to a network interface 708 for communication over a network.

The storage medium or storage media 706 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:
   receiving, by a print order manager including a processor, unencrypted metadata associated with encrypted print content, wherein the unencrypted metadata is extracted from a print document, and the encrypted print content is produced by encrypting the print document, wherein the encrypted print content is included in an encrypted print document that also includes an encrypted version of the unencrypted metadata;
   identifying, by the print order manager, a printer system from among plural printer systems to which the encrypted print content is to be routed, wherein the identifying is based on the unencrypted metadata extracted from the print document; and causing, by the print order manager, the encrypted print content to be sent to the identified printer system for decryption of the encrypted print content and printing of the decrypted print content.

2. The method of claim 1, further comprising:

sending instructions to the identified printer system, wherein the instructions are based on the unencrypted metadata extracted from the print document and are for guiding the identified printer system in printing the decrypted print content.

3. The method of claim 1, wherein identifying the printer system is based on determining, from the unencrypted metadata, that a first of the printer systems is more effective for printing the encrypted print content than a second of the printer systems.

4. The method of claim 1, wherein receiving the unencrypted metadata comprises receiving the unencrypted metadata that indicates at least one feature of the encrypted print content, wherein the at least one feature is more effectively processed by a first of the printer systems than a second of the printer systems.

5. The method of claim 1, wherein causing the encrypted print content to be sent to the identified printer system comprises sending an instruction to a system having a data storage storing the encrypted print content, wherein the instruction is to cause the system to send the encrypted print content to the identified printer system.

6. The method of claim 5, wherein sending the instruction to the system comprises sending the instruction to an unsecure data center that provides cloud storage.

7. The method of claim 5, wherein sending the instruction to the system comprises sending the instruction to a print shop system.

8. A print order manager comprising:

an interface to receive unencrypted metadata associated with encrypted print content, wherein the unencrypted metadata is extracted from a print document, and the encrypted print content is produced by encrypting the print document, wherein the encrypted print content is included in an encrypted print document that also includes an encrypted version of the unencrypted metadata; and at least one processor to:

identify a printer system from among plural printer systems to which the encrypted print content is to be routed, wherein the identifying is based on the unencrypted metadata extracted from the print document; and cause the encrypted print content to be sent to the identified printer system for decryption of the encrypted print content and printing of the decrypted print content.

9. The print order manager of claim 8, wherein the at least one processor is to further:

send instructions to the identified printer system, wherein the instructions are based on the unencrypted metadata extracted from the print document and are for guiding the identified printer system in printing the decrypted print content.

10. The print order manager of claim 8, wherein the identification of the printer system is based on determining, from the unencrypted metadata that indicates at least one feature of the encrypted print content, that a first of the printer systems is more effective for printing the encrypted print content than a second of the printer systems.

11. The print order manager of claim 8, wherein the at least one processor is to cause the encrypted print content to be sent to the identified printer system by sending an instruction to a system having a data storage storing the encrypted print content, wherein the instruction is to cause the system to send the encrypted print content to the identified printer system.

12. The print order manager of claim 11, wherein the system provides cloud storage.

13. The method of claim 1, wherein receiving the unencrypted metadata comprises the print order manager receiving the unencrypted metadata from a system over a network, the system to extract the unencrypted metadata from the print document and to encrypt the print document.

14. The print order manager of claim 8, wherein the interface is to receive the unencrypted metadata from a system over a network, the system to extract the unencrypted metadata from the print document and to encrypt the print document.

* * * * *